United States Patent
Wong

Patent Number: 5,835,394
Date of Patent: *Nov. 10, 1998

[54] CALCULATING SELECTED SIGN 3 EXPRESSION IN A SINGLE INSTRUCTION CYCLE

[75] Inventor: Roney S. Wong, Sunnyvale, Calif.

[73] Assignee: Samsung Electronics Co., Ltd., Calif.

[*] Notice: The term of this patent shall not extend beyond the expiration date of Pat. Nos. 5,831,886 and 5,831,887.

[21] Appl. No.: 719,190

[22] Filed: Sep. 24, 1996

[51] Int. Cl.$^6$ .................................................... G06F 7/50
[52] U.S. Cl. ...................................... 364/768; 364/784.01
[58] Field of Search ..................................... 364/768, 770, 364/746.2, 715.012, 715.011, 715.02, 784.01; 395/562

[56] References Cited

U.S. PATENT DOCUMENTS

| | | | |
|---|---|---|---|
| 4,218,751 | 8/1980 | McManigal | 364/715.012 |
| 4,709,226 | 11/1987 | Christopher | 341/93 |
| 4,953,115 | 8/1990 | Kanoh | 364/715.012 |
| 5,267,187 | 11/1993 | Hsieh et al. | 364/784.01 |
| 5,373,459 | 12/1994 | Taniguchi | 364/715.012 |
| 5,574,671 | 11/1996 | Young et al. | 364/715.03 |

OTHER PUBLICATIONS

U.S. application No. 08/658,454, filed Jun. 5, 1996, entitled "Zero Detect for Binary Sum" by R. Wong.
U.S. application No. 08/695,142, filed Aug. 8, 1996, entitled "Zero Detect for Binary Difference" by R. Wong.

Primary Examiner—Reba I. Elmore
Assistant Examiner—Robert J. Dolan
Attorney, Agent, or Firm—Skjerven, Morrill, MacPherson, Franklin, & Friel; David M. Sigmond

[57] ABSTRACT

A selected one of the expressions 2A+sign(A), 2A−sign(A), A+sign(A), and A−sign(A) is calculated, where A is a signed binary integer represented in 2's complement form, sign(A) is equal to one when A is greater than zero, sign(A) is equal to zero when A is zero, and sign(A) is equal to negative one when A is less than zero. Advantageously, the selected sign 3 expression can be calculated by a general purpose computer in a single instruction cycle.

14 Claims, 9 Drawing Sheets

CALCULATING SELECTED SIGN 3 EXPRESSION IN A SINGLE INSTRUCTION CYCLE

BACKGROUND OF THE INVENTION

Field of the Invention

The present invention relates to computer arithmetic, and more particularly to calculating the expressions 2A+sign(A), 2A−sign(A), A+sign(A), and A−sign(A) for signed binary integers.

Description of Related Art

The Moving Picture Experts Group (MPEG) standard has emerged as the dominant standard for compressed digital video. The MPEG-1 standard specifies a compressed video bit-stream rate of approximately 1.5 megabits per second, and a compressed stereo audio bit-stream rate of approximately 250 kilobits per second. The second standard, MPEG-2, will specify compression rates for higher-bandwidth distribution media, and is in the process of being formalized. To meet the MPEG standard, video and audio compression and decompression products must rapidly process the various algorithms used to implement the MPEG standard.

In MPEG video signal processing, the basic video information processing unit is typically a macro-block, which has a 16×16 pixel matrix comprising four 8×8 luminance blocks, and two 8×8 chrominance blocks. Each pixel in a luminance block or chrominance block has an output corresponding to an unsigned integer number, and each macro-block is part of a much larger luminance or chrominance frame, as the case may be.

MPEG video signal processing includes a computation requirement for calculating the sign 3 expressions 2A+sign (A) and A−sign(A) for each pixel in a block, where A is a signed binary integer, sign (A) is equal to one when A is greater than zero, sign(A) is equal to zero when A is zero, and sign (A) is equal to negative one when A is less than zero. For completeness, it is useful to be able to calculate other sign 3 expressions such as 2A−sign(A) and A+sign(A).

Conventional approaches for calculating sign 3 expressions normally require several instruction cycles. Separate instruction cycles are typically used to determine whether A is less than, equal to, or greater than zero, and then to increment or decrement an intermediate result (such as A or 2A) as the case may be.

Moreover, providing zero detect of A may require a large amount of chip area or several instruction cycles using conventional approaches. For instance, zero detect of an n-bit operand can be provided by an n-bit OR gate coupled to an inverter. The OR gate outputs a zero, which the inverter converts to a one, only when the operand consists of zero's. Drawbacks to this approach include the increased fan-in of the OR gate, which increases chip area, and the delay associated with ORing each bit of the operand. Another known technique for zero detect of a binary operand includes serially right-shifting the operand, and inspecting the shifted-out bits one at a time. As soon as a shifted-outbit of one is detected then the operand must be nonzero, whereas if all shifted-outbits are zero's then the operand must be zero. A drawback to this approach is that the right-shifting operation can be relatively time consuming and particularly difficult to implement in a single instruction cycle.

Accordingly, a need exists for calculating 2A+sign(A), 2A−sign(A), A+sign(A), and A−sign(A) in a rapid and efficient manner.

SUMMARY OF THE INVENTION

An object of the invention is to provide rapid and efficient calculation of 2A+sign(A), 2A−sign(A), A+sign(A), and A−sign(A). In accordance with a preferred aspect of the invention, a selected one of these expressions is calculated by a general purpose computer in a single instruction cycle.

The present invention includes a method of operating a circuit to calculate a selected one of 2A+sign(A), 2A−sign (A), A+sign(A), and A−sign(A).

The method for calculating 2A+sign(A) includes bit-complementing A to obtain $\overline{A}$, bit-complementing($\overline{A}$+$\overline{A}$+2) to obtain 2A+sign(A) when A is less than zero, bit-complementing ($\overline{A}$+$\overline{A}$+1) to obtain 2A+sign(A) when A is equal to zero, and bit-complementing all bits except a least significant bit of ($\overline{A}$+$\overline{A}$+1) to obtain 2A+sign(A) when A is greater than zero. Preferably, the method includes setting a constant C to two and selecting the bit-complement of the least significant bit of ($\overline{A}$+$\overline{A}$+2) when A is less than zero, setting the constant C to one and selecting the bit-complement of the least significant bit of ($\overline{A}$+$\overline{A}$+1) when A is zero, and setting the constant C to one and selecting the least significant bit of ($\overline{A}$+$\overline{A}$+1) when A is greater than zero. Setting the constant C is in response to a sign bit of A, and the selecting is in response to the sign bit of A and a zero detect flag indicative of whether A is zero or nonzero. Furthermore, zero detect of A can be provided by determining whether a first carry-outbit from ($\overline{A}$+$\overline{A}$+1) and a second carry-outbit from ($\overline{A}$+$\overline{A}$+2) have different logical values.

The method for calculating 2A−sign(A) includes bit-complementing A to obtain $\overline{A}$, bit-complementing ($\overline{A}$+$\overline{A}$) to obtain 2A−sign(A) when A is less than zero, bit-complementing ($\overline{A}$+$\overline{A}$+1) to obtain 2A−sign(A) when A is equal to zero, and bit-complementing ($\overline{A}$+$\overline{A}$+2) to obtain 2A−sign(A) when A is greater than zero. Preferably, the method includes setting a constant C to zero and selecting a sum output of ($\overline{A}$+$\overline{A}$) when A is less than zero, setting the constant C to one and selecting a sum output of ($\overline{A}$+$\overline{A}$+1) when A is zero, and setting the constant C to one and selecting a sum-plus-one output of ($\overline{A}$+$\overline{A}$+2) when A is greater than zero. Setting the constant C is in response to a sign bit of A, and the selecting is in response to the sign bit of A and a zero detect flag indicative of whether A is zero or nonzero. Furthermore, zero detect of A can be provided by determining whether a first carry-outbit from ($\overline{A}$+$\overline{A}$+1) and a second carry-out bit from ($\overline{A}$+$\overline{A}$+2) have different logical values.

The method for calculating A+sign(A) includes bit-complementing A to obtain $\overline{A}$, bit-complementing ($\overline{A}$+1) to obtain A+sign(A) when A is less than zero, bit-complementing $\overline{A}$ to obtain A+sign(A) when A is equal to zero, bit-complementing($\overline{A}$−1) to obtain A+sign(A) when A is greater than zero and A is odd, and bit-complementing all bits except a least significant bit of $\overline{A}$ to obtain A+sign(A) when A is greater than zero and A is even. Preferably, the method includes setting a constant C to one and selecting the bit-complement of the least significant bit of ($\overline{A}$+1) when A is less than zero, setting the constant C to zero and selecting the bit-complement of the least significant bit of $\overline{A}$ when A is zero, setting the constant C to negative one and selecting the bit-complement of the least significant bit of ($\overline{A}$1) when A is greater than zero and A is odd, and setting the constant C to zero and selecting the least significant bit of $\overline{A}$ when A is greater than zero and A is even. Setting the constant C is in response to a sign bit of A, and a least significant bit of A indicative of whether A is odd or even. The selecting is in response to the sign bit of A, the least significant bit of A, and a zero detect flag indicative of whether A is zero or nonzero. Furthermore, zero detect of A can be provided by determining whether a first carry-out bit from $(\overline{A}+0)$ and a second carry-out bit from $(\overline{A}+1)$ have different logical values.

The method for calculating A–sign(A) includes bit-complementing A to obtain $\overline{A}$, bit-complementing $(\overline{A}-1)$ to obtain A–sign(A) when A is less than zero, bit-complementing $\overline{A}$ to obtain A–sign(A) when A is equal to zero, and bit-complementing$(\overline{A}+1)$ to obtain A–sign(A) when A is greater than zero. Preferably, the method includes setting a constant C to negative one and selecting a sum output of $(\overline{A}-1)$ when A is less than zero, setting the constant C to zero and selecting a sum output of $\overline{A}$ when A is zero, and setting the constant C to zero and selecting a sum-plus-one output of $(\overline{A}+1)$ when A is greater than zero. Setting the constant C is in response to a sign bit of A, and the selecting is in response to the sign bit of A and a zero detect flag indicative of whether A is zero or nonzero. Furthermore, zero detect of A can be provided by determining whether a first carry-out bit from $(\overline{A}+0)$ and a second carry-out bit from $(\overline{A}+1)$ have different logical values.

The present invention also includes an apparatus for calculating a selected one of 2A+sign(A), 2A–sign(A), A+sign(A), and A–sign(A). The apparatus includes first and second inverter circuits, a data selector circuit, an adder circuit, a zero detect circuit, a control circuit, and first and second multiplexers in combination. The first inverter circuit provides the bit-complement of A to a first operand input of the adder circuit. The first multiplexer selects between the bit-complement of A and zero, in response to a MODE signal indicative of which expression is selected, for a second operand input of the adder circuit. The data selector circuit sets a constant C to an appropriate value, in response to the MODE signal and A, for a third operand input of the adder circuit. The adder circuit calculates a sum of the first, second and third operands at a sum output, and a sum-plus-one of the first, second, and third operands at a sum-plus-one output. The second multiplexer selects between the sum output with the LSB set to zero, the sum output, and the sum-plus-one output in response the control circuit. The control circuit instructs the second multiplexer in response to the MODE signal, A, and a zero detect circuit indicative of whether A is zero or nonzero. Finally, the second inverter circuit bit-complements the multiplexer output to provide the result.

In one embodiment, the first multiplexer outputs $\overline{A}$ when 2A+sign(A) or 2A–sign(A) is selected and otherwise outputs zero. The data selector circuit sets the constant C to two when A is negative and 2A+sign(A) is selected, to one when A is positive and 2A+sign(A) or 2A sign(A) is selected or when A is negative and A+sign(A) is selected, to negative one when A is positive and odd and A+sign(A) is selected or when A is negative and A–sign(A) is selected, and otherwise to zero. The second multiplexer selects the sum-plus-one output when A is greater than zero and 2A–sign(A) or A–sign(A) is selected, selects the sum output when A is less than or equal to zero or when A is greater than zero and odd and A+sign(A) is selected, and selects the sum output with the LSB to zero when A is greater than zero and 2A+sign(A) is selected or when A is greater than zero and even and A+sign(A) is selected.

Preferably, the adder circuit generates a first carry-out bit from the sum output and a second carry-out bit from the sum-plus-one output, and the zero detect circuit determines whether A is zero by determining whether the first and second carry-out bits have different logical values.

These and other objects, features and advantages of the invention will be further described and more readily apparent from a review of the detailed description of the preferred embodiments which follow.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

The present invention calculates a selected one of 2A+sign(A), 2A–sign(A), A+sign(A), and A–sign(A) in a single instruction cycle. As used herein, A is a signed binary integer represented in 2's complement form. As mentioned above, sign(A) is equal to one when A is greater than zero, sign(A) is equal to zero when A is zero, and sign(A) is equal to negative one when A is less than zero. Determining whether A is positive (including zero) or negative is accomplished by inspection of its most significant bit ("MSB"). For a positive A the MSB=0, whereas for a negative A the MSB=1. Bit-complementing is equivalent to a 1's complement operation. For instance, $\overline{A}$ designates the bit-complement of A. Finally, incrementing refers to increasing by one.

The present invention calculates 2A+sign(A) in a single instruction cycle by bit-complementing A to obtain $\overline{A}$, bit-complementing$(\overline{A}+\overline{A}+2)$ to obtain 2A+sign(A) when A is less than zero, bit-complementing$(\overline{A}+\overline{A}+1)$ to obtain 2A+sign(A) when A is equal to zero, and bit-complementing all bits except a least significant bit of$(\overline{A}+\overline{A}+1)$ to obtain 2A+sign(A) when A is greater than zero.

Figure 1:
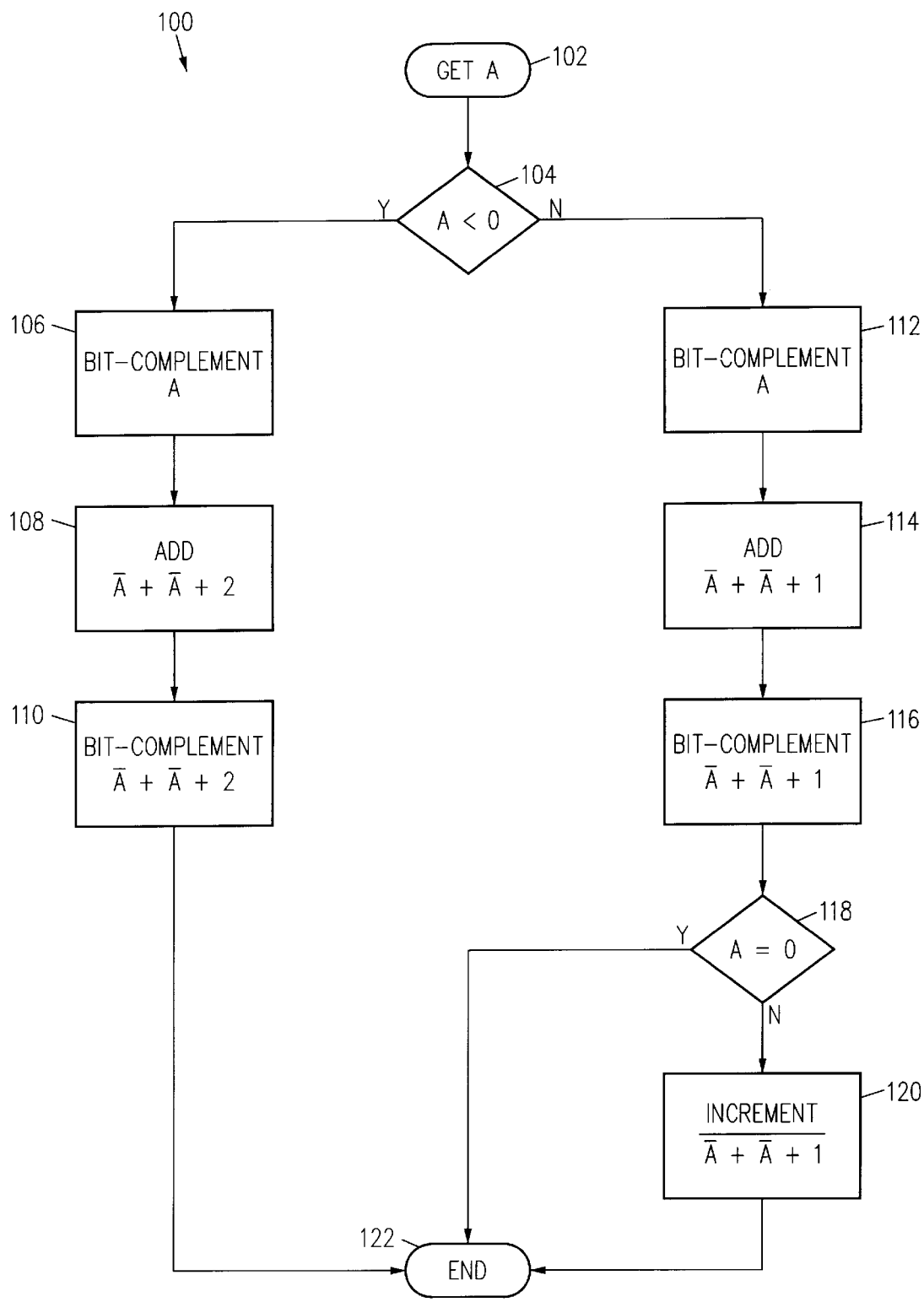
FIG. 1 is a flow chart of an algorithm for calculating 2A+sign(A) in accordance with an embodiment of the present invention.

FIG. 1 is a flow chart of algorithm 100 for calculating 2A+sign(A) in accordance with an embodiment of the invention. At step 102, signed binary operand A is obtained. Decision step 104 tests whether A is negative. If A is negative, at step 106 A is bit-complemented, at step 108 the sum $\overline{A}+\overline{A}+2$ is calculated, at step 110 the sum $\overline{A}+\overline{A}+2$ is bit-complemented to provide the result, and the algorithm terminates at end step 122. Returning to decision step 104, if A is nonnegative, at step 112 A is bit-complemented, at step 114 the sum $\overline{A}+\overline{A}+1$ is calculated, at step 116 the bit-complement of $\overline{A}+\overline{A}+1$ is obtained, and decision step 118 tests whether A is zero. If A is zero, then the bit-complement of $\overline{A}+\overline{A}+1$ provides the result and the algorithm terminates at end step 122. If A is nonzero (and therefore greater than zero since A is also nonnegative), then at step 120 the bit-complement of $\overline{A}+\overline{A}+1$ is incremented to provide the result and the algorithm terminates at end step 122.

Variations to algorithm 100 are apparent. For instance, A can be bit-complemented before the sign bit (or complemented sign bit) of A is inspected. For each value of A, the expressions $\overline{A}+\overline{A}+2$, $\overline{A}+\overline{A}+1$, and $\overline{A}+\overline{A}+1+1$ can be calculated (concurrently if desired) with the appropriate expression selected depending on whether A is less than, equal to, or greater than zero, respectively. Likewise, A can be tested for being less than, equal to, or greater than zero before the appropriate expression is calculated.

It is noted that the least significant bit (LSB) of $\overline{A}+\overline{A}$ must always be a zero (since 0+0=0 and 1+1=10), therefore the LSB of $\overline{A}+\overline{A}+1$ must always be a one, the LSB of $\overline{A}+\overline{A}+1$ must always be a zero, and the LSB of $\overline{A}+\overline{A}+1+1$ must always be a one. Therefore, $\overline{A}+\overline{A}+1+1$ can be obtained in several ways, including (1) incrementing $\overline{A}+\overline{A}+1$; (2) calculating $\overline{A}+\overline{A}+1$ and setting the LSB to one; (3) selecting the LSB of $\overline{A}+\overline{A}+1$ when A is equal to zero and selecting the LSB of $\overline{A}+\overline{A}+1$ when A is greater than zero; and (4) setting the LSB of $\overline{A}+\overline{A}+1$ to zero and then bit-complementing the intermediate result. $\overline{A}+\overline{A}+1+1$ is equivalent to bit-complementing all bits except the LSB of $\overline{A}+\overline{A}+1$.

With regards to overflow, if A is an n-bit number, and 2A+sign(A) is an n-bit or n+1 bit result, then overflow may occur. For instance, if the MSB (or sign bit) of A and the MSB (or sign bit) of the result have different logical values, then overflow occurs. Furthermore, the maximum negative integer value of A will cause overflow even though the MSB's of A and the result are both one's. Therefore, a separate test is needed to indicate overflow due to the maximum negative integer value of A. As one approach, each bit of A can be inspected to determine whether A has this value. However, a more efficient approach is to determine whether the MSB and MSB−1 positions of A have different logical values, since this is the case for the maximum negative integer value as well as other values that cause overflow. Therefore, overflow can be detected by ORing (1) the EXCLUSIVE-OR of the MSB of A and the MSB of the result, and (2) the EXCLUSIVE-OR of the MSB and MSB−1 of A. Furthermore, when overflow occurs, it may be desirable to clamp the result to the maximum integer value with the same sign as A.

Alternatively, if A is an n-bit number and 2A+sign(A) is at least an n+2 bit result, then overflow does not occur. An n+2 bit result is necessary to accommodate the maximum negative integer value of A.

Suppose, for instance, A is a 4-bit operand. The maximum negative integer value of A is binary 1000 (−8). Plugging 1000 into 2A+sign(A) yields 101111(2×(−8)+(−1)=−17), which is a 6-bit number. Thus, the result requires two more bits than A. Furthermore, the 4-bit result 1111 has the same MSB as A. Finally, for those values of A where the MSB and MSB−1 positions have different logical values, namely 0100, 0101, 0110, 0111, 1000, 1001, 1010 and 1011, a 4-bit result always overflows.

Further details regarding 2A+sign(A) are set forth in U.S. application Ser. No. 08/719,187, filed concurrently herewith, entitled "Calculating 2A+sign(A) In A Single Instruction Cycle" by R. Wong, which is incorporated herein by reference.

The present invention calculates 2A−sign(A) in a single instruction cycle by bit-complementing A to obtain $\overline{A}$, bit-complementing $(\overline{A}+\overline{A})$ to obtain 2A−sign(A) when A is less than zero, bit-complementing $(\overline{A}+\overline{A}+1)$ to obtain 2A−sign(A) when A is equal to zero, and bit-complementing $(\overline{A}+\overline{A}+2)$ to obtain 2A−sign(A) when A is greater than zero.

Figure 2:
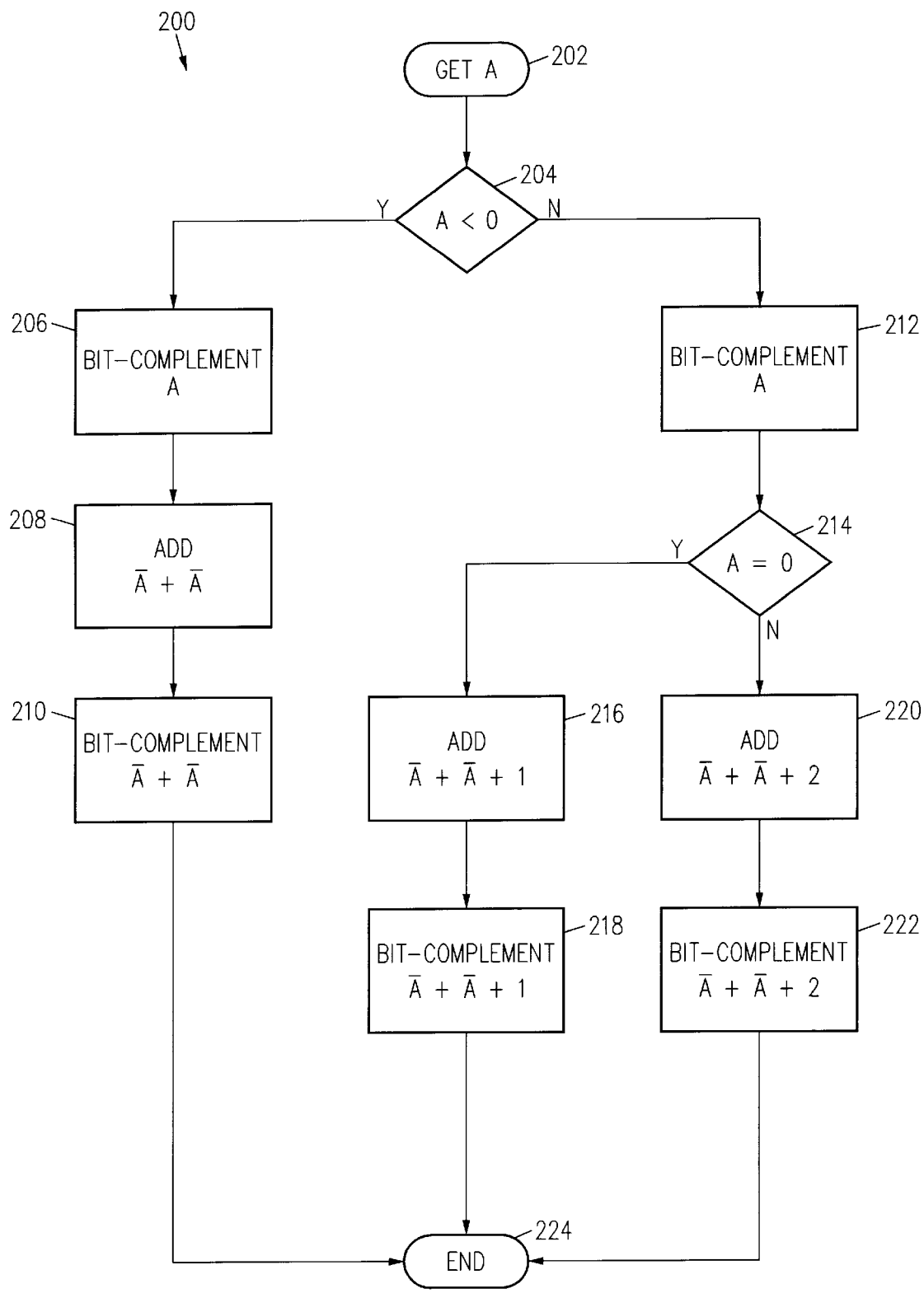
FIG. 2 is a flow chart of an algorithm for calculating 2A–sign(A) in accordance with an embodiment of the present invention.

FIG. 2 is a flow chart of algorithm 200 for calculating 2A−sign(A) in accordance with an embodiment of the invention. At step 202, signed binary operand A is obtained.

Decision step 204 tests whether A is negative. If A is negative, at step 206 A is bit 5 complemented, at step 208 the sum $\overline{A}+\overline{A}$ is calculated, at step 210 the sum $\overline{A}+\overline{A}$ is bit-complemented to provide the result, and the algorithm terminates at end step 224. Returning to decision step 204, if A is nonnegative, at step 212 A is bit-complemented, and decision step 214 tests whether A is zero. If A is zero, at step 216 the sum $\overline{A}+\overline{A}+1$ is calculated, at step 218 the sum $\overline{A}+\overline{A}+1$ is bit-complemented to provide the result, and the algorithm terminates at end step 224. Returning to decision step 214, if A is nonzero (and therefore greater than zero since A is also nonnegative), then at step 220 the sum $\overline{A}+\overline{A}+2$ is calculated, at step 222 the sum $\overline{A}+\overline{A}+2$ is bit-complemented to provide the result, and the algorithm terminates at end step 224.

Variations to algorithm 200 are apparent. For instance, A can be bit-complemented before the sign bit (or complemented sign bit) of A is inspected. For each value of A, the expressions $\overline{A}+\overline{A}$, $\overline{A}+\overline{A}+1$ and $\overline{A}+\overline{A}+2$ can be calculated (concurrently if desired) with the appropriate expression selected depending on whether A is less than, equal to, or greater than zero, respectively. Likewise, A can be tested for being less than, equal to, or greater than zero before the appropriate expression is calculated.

With regards to overflow, if A is an n-bit number, and 2A−sign(A) is an n-bit result, then overflow may occur. Overflow occurs when the MSB (or sign bit) of A and the MSB (or sign bit) of the result have different logical values. Therefore, overflow can be detected by EXCLUSIVE-ORing of the MSB of A and the MSB of the result. Furthermore, when overflow occurs, it may be desirable to clamp the result to the maximum integer value with the same sign as A.

Alternatively, if A is an n-bit number and 2A−sign(A) is at least an n+1 bit result, then overflow does not occur. That is, an n+1 bit will accommodate 2A, and subtracting sign(A) from 2A never increases the absolute value of 2A.

Further details regarding 2A−sign(A) are set forth in U.S. application Ser. No. 08/719,187, filed concurrently herewith, entitled "Calculating 2A−sign(A) In A Single Instruction Cycle" by R. Wong, which is incorporated herein by reference.

The present invention calculates A+sign(A) in a single instruction cycle by bit-complementing A to obtain $\overline{A}$, bit-complementing$(\overline{A}+1)$ to obtain A+sign(A) when A is less than zero, bit-complementing $\overline{A}$ to obtain A+sign(A) when A is equal to zero, bit-complementing $(\overline{A}-1)$ to obtain A+sign(A) when A is greater than zero and A is odd, and bit-complementing all bits except a least significant bit of $\overline{A}$ to obtain A+sign(A) when A is greater than zero and A is even.

It is noted that if A is greater than zero and even, the LSB of A must always must always be a zero, therefore the LSB of $\overline{A}$ must always be a one, the LSB of $\overline{\overline{A}}$ must always be a zero, and the LSB of $\overline{A}+1$ must always be a one. Therefore, $\overline{A}+1$ can be obtained in several ways, including (1) incrementing $\overline{A}$; (2) providing $\overline{A}$ and setting the LSB to one; (3) providing $\overline{A}$ and selecting the LSB of $\overline{\overline{A}}$ instead of $\overline{A}$; and (4) setting the LSB of $\overline{A}$ to zero all bits except the LSB of $\overline{A}$.

Figure 3:
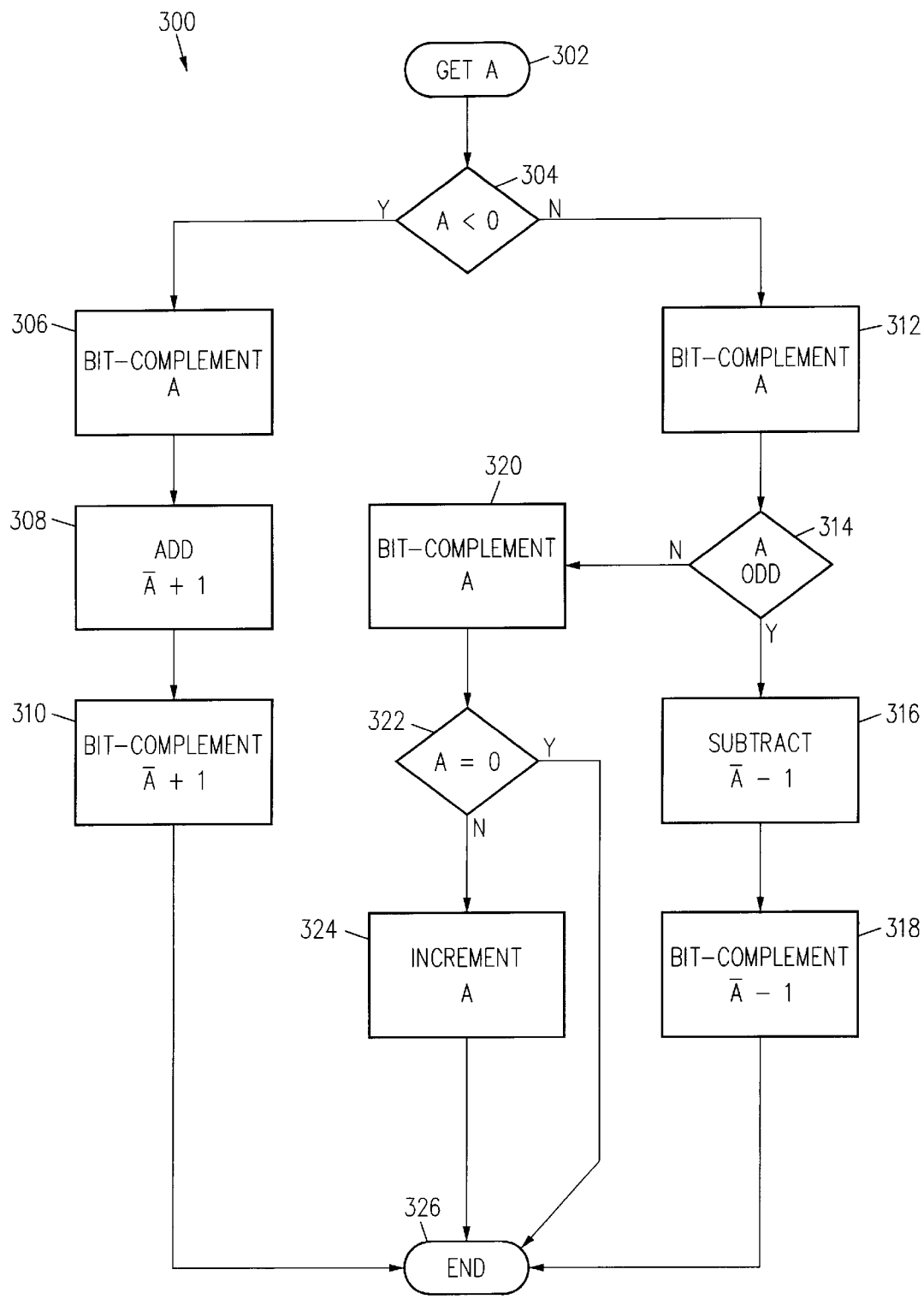
FIG. 3 is a flow chart of an algorithm for calculating A+sign(A) in accordance with an embodiment of the present invention.

FIG. 3 is a flow chart of algorithm 300 for calculating A+sign(A) in accordance with an embodiment of the invention. At step 302, signed binary operand A is obtained. Decision step 304 tests whether A is negative. If A is negative, at step 306 A is bit-complemented, at step 308 the sum $\overline{A}$+1 is calculated, at step 310 the sum $\overline{A}$+1 is bit-complemented to provide the result, and the algorithm terminates at end step 326. Returning to decision step 304, if A is nonnegative, at step 312 A is bit-complemented, and decision step 314 tests whether A is odd. If A is odd (and therefore greater than zero since A is also nonnegative)then at step 316 the difference $\overline{A}$−1 is calculated, at step 318 the difference $\overline{A}$−1 is bit-complemented to provide the result, and the algorithm terminates at end step 326. Returning to decision step 314, if A is not odd then at step 320 A is bit-complemented, and decision step 322 tests whether A is zero. If A is zero, the bit-complement of $\overline{A}$ provides the result and the algorithm terminates at end step 326. If A is nonzero (and therefore greater than zero and even since A is nonnegative and not odd), then at step 324 the bit-complement of $\overline{A}$ is incremented to provide the result and the algorithm terminates at end step 326.

Variations to algorithm 300 are apparent. For instance, A can be bit-complemented before the sign bit (or complemented sign bit) of A is inspected. For each value of A, the expressions $\overline{\overline{A}+1}$, $\overline{\overline{A}}$, $\overline{\overline{A}-1}$ and $\overline{\overline{A}+1}$ can be calculated (concurrently if desired) with the appropriate expression selected depending on whether A is less than zero, equal to zero, greater than zero and odd, or greater than zero and even, respectively. Likewise, A can be tested for being less than zero, equal to zero, greater than zero and odd, or greater than zero and even before the appropriate expression is calculated.

With regards to overflow, if A is an n-bit number, and A+sign(A) is an n-bit result, then overflow may occur. In particular, if A has the maximum positive or negative integer value, then adding sign(A) will cause overflow. Also, when overflow occurs, the MSB (or sign bit) of A and the MSB (or sign bit) of the result have different logical values. Therefore, overflow can be detected by EXCLUSIVE-ORing of the MSB of A and the MSB of the result. Furthermore, when overflow occurs, it may be desirable to clamp the result to A, which already represents the maximum positive or negative integer value.

Alternatively, if A is an n-bit number and A+sign(A) is at least an n+1 bit result, then overflow does not occur. That is, an n+1 bit result accommodates A+sign(A), since A+sign(A) does not exceed 2A.

Further details regarding A+sign(A) are set forth in U.S. application Ser. No. 08/719,186, filed concurrently herewith, entitled "Calculating A+sign(A) In A Single Instruction Cycle" by R. Wong, which is incorporated herein by reference.

The present invention calculates A−sign(A) in a single instruction cycle by bit-complementing A to obtain $\overline{A}$, bit-complementing($\overline{A}$−1) to obtain A−sign(A) when A is less than zero, bit-complementing $\overline{A}$ to obtain A−sign(A) when A is equal to zero, and bit-complementing ($\overline{A}$+1) to obtain A−sign(A) when A is greater than zero.

Figure 4:
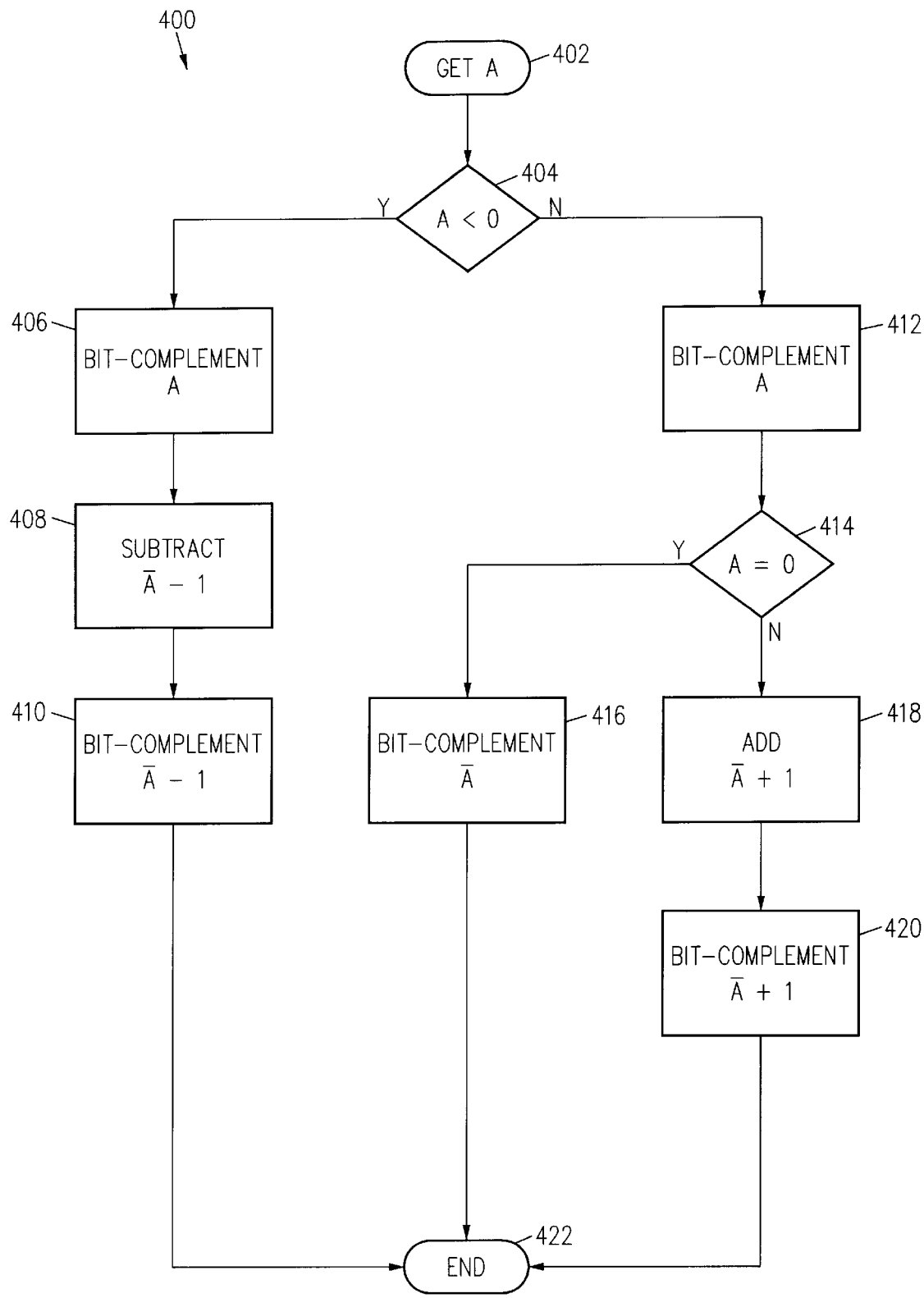
FIG. 4 is a flow chart of an algorithm for calculating A–sign(A) in accordance with an embodiment of the present invention.

FIG. 4 is a flow chart of algorithm 400 for calculating A−sign(A) in accordance with an embodiment of the invention. At step 402, signed binary operand A is obtained. Decision step 404 tests whether A is negative. If A is negative, at step 406 A is bit-complemented, at step 408 the difference $\overline{A}$−1 is calculated, at step 410 the difference $\overline{A}$−1 is bit-complemented to provide the result, and the algorithm terminates at end step 422. Returning to decision step 404, if A is nonnegative, at step 412 A is bit-complemented, and decision step 414 tests whether A is zero. If A is zero, at step 416 $\overline{A}$ is bit-complemented to provide the result, and the algorithm terminates at end step 422. Returning to decision step 414, if A is nonzero (and therefore greater than zero since A is also nonnegative) then at step 418 the sum $\overline{A}$+1 is calculated, at step 420 the sum $\overline{A}$+1 is bit-complemented to provide the result, and the algorithm terminates at end step 422.

Variations to algorithm 400 are apparent. For instance, A can be bit-complemented before the sign bit (or complemented sign bit) of A is inspected. For each value of A, the expressions $\overline{\overline{A}-1}$, $\overline{\overline{A}}$ and $\overline{\overline{A}+1}$ can be calculated (concurrently if desired) with the appropriate expression selected depending on whether A is less than, equal to, or greater than zero, respectively. Likewise, A can be tested for being less than, equal to, or greater than zero before the appropriate expression is calculated.

With regards to overflow, if A is an n-bit number, and A−sign(A) is an n-bit result, then overflow does not occur. That is, A−sign(A) never increases the absolute value of A.

Further details regarding A−sign(A) are set forth in U.S. application Ser. No. 08/719,185, filed concurrently herewith, entitled "Calculating A−sign(A) In A Single Instruction Cycle" by R. Wong, which is incorporated herein by reference.

Zero detect of A can be accomplished by bit-complementing A, and inspecting a carry-out bit from the MSB position generated by incrementing the bit-complement of A. The carry-out bit is a one only if the bit-complement of A is a string of one's, otherwise the carry-out bit is a zero. Furthermore, the bit-complement of A is a string of one's only if A is a string of zero's. Therefore, the carry-out bit generated by incrementing the bit-complement of A is a one only if A is zero. In a similar manner, zero detect of A can be accomplished by decrementing A, and inspecting a carry-out bit generated by incrementing A−1.

Zero detect of A can also be accomplished by generating a first carry-out bit from the MSB position of the sum $\overline{A}$+$\overline{A}$+1, generating a second carry-out bit from the MSB position of the sum $\overline{A}$+$\overline{A}$+2, and determining whether the first and second carry-out bits have different logical values. When A is zero, the first sum is a string of one's, the second sum is a string of zero's, and the first and second carry-out bits will have different logical values. Likewise, when A is nonzero, the first and second carry-out bits will have identical logical values. Advantageously, the first and second carry-out bits can be generated concurrently to provide rapid zero detect. Furthermore, the first and second carry-out bits can be generated without (or before) actually summing the numbers, for instance by use of PG generator sections and carry chains.

Suppose A is an n-bit operand. If A is equal to zero, the sum A+A is an n-bit string of zero's. As a result, the bit-complement of A+A, or $\overline{A+A}$, is an n-bit string of one's, and incrementing $\overline{A+A}$ provides an n-bit string of zero's with a carry-outbit of one. Thus, zero detect for A can be provided by adding A+A, bit-complementing A+A to obtain $\overline{A+A}$, incrementing $\overline{A+A}$, and inspecting the carry-outbit. In algorithms 100 rough 400, however, A+A is not calculated. Consider the following algebraic manipulations:

$$\overline{A+A}=-(A+A)-1 \qquad (1)$$

$$\overline{A+A}=-A+-A-1 \qquad (2)$$

$$\overline{A+A} = (\overline{A}+1) + (\overline{A}+1) - 1 \quad (3)$$

$$\overline{A+A} = \overline{A} + \overline{A} + 1 \quad (4)$$

Likewise, $$\overline{A+A} + 1 = -(A+A) - 1 + 1 \quad (5)$$

$$\overline{A+A} + 1 = -A + -A - 1 + 1 \quad (6)$$

$$\overline{A+A} + 1 = (\overline{A}+1) + (\overline{A}+1) \quad (7)$$

$$\overline{A+A} + 1 = \overline{A} + \overline{A} + 2 \quad (8)$$

Thus, if A is an n-bit string of zero's, $\overline{A}+\overline{A}+1$ is an n-bit string of one's that generates a first carry-out bit of one from the MSB position, and $\overline{A}+\overline{A}+2$ is an n-bit string of zero's that generates a second carry-out bit of zero from the MSB position (and another carry-out bit of one from the MSB+1 position, which is discarded). Accordingly, the first and second carry-out bits have different logical values since A is zero. Remarkably, the sums $\overline{A}+\overline{A}+1$ and $\overline{A}+\overline{A}+2$ can be used for calculating 2A+sign(A), calculating 2A−sign(A), and determining whether A is zero.

Zero detect of A can also be accomplished by generating a first carry-out bit from the MSB position of the sum $\overline{A}+0$, generating a second carry-out bit from the MSB position of the sum $\overline{A}+1$, and determining whether the first and second carry-out bits have different logical values. When A is zero, the first sun is a string of one's, the second sum is a string of zero's, and the first and second carry-out bits will have different logical values. Likewise, when A is nonzero, the first and second carry-out bits will have identical logical values. Advantageously, the first and second carry-out bits can be generated concurrently to provide rapid zero detect. Furthermore, the first and second carry-out bits can be generated without (or before) actually summing the numbers, for instance by use of PG generator sections and carry chains.

Thus, if A is an n-bit string of zero's, $\overline{A}+0$ is an n-bit string of one's that generates a first carry-out bit of zero from the MSB position, and $\overline{A}+1$ is an n-bit string of zero's that generates a second carry-out bit of one from the MSB position. Accordingly, the first and second carry-out bits have different logical values since A is zero. Remarkably, the sums $\overline{A}+0$ and $\overline{A}+1$ can be used for calculating A+sign(A), calculating A−sign(A), and determining whether A is zero.

Further details regarding zero detect are set forth in U.S. application Ser. No. 08/65 8,454, filed Jun. 5, 1996, entitled "Zero Detect For Binary Sum" by R. Wong, which is incorporated herein by reference.

Figure 5:
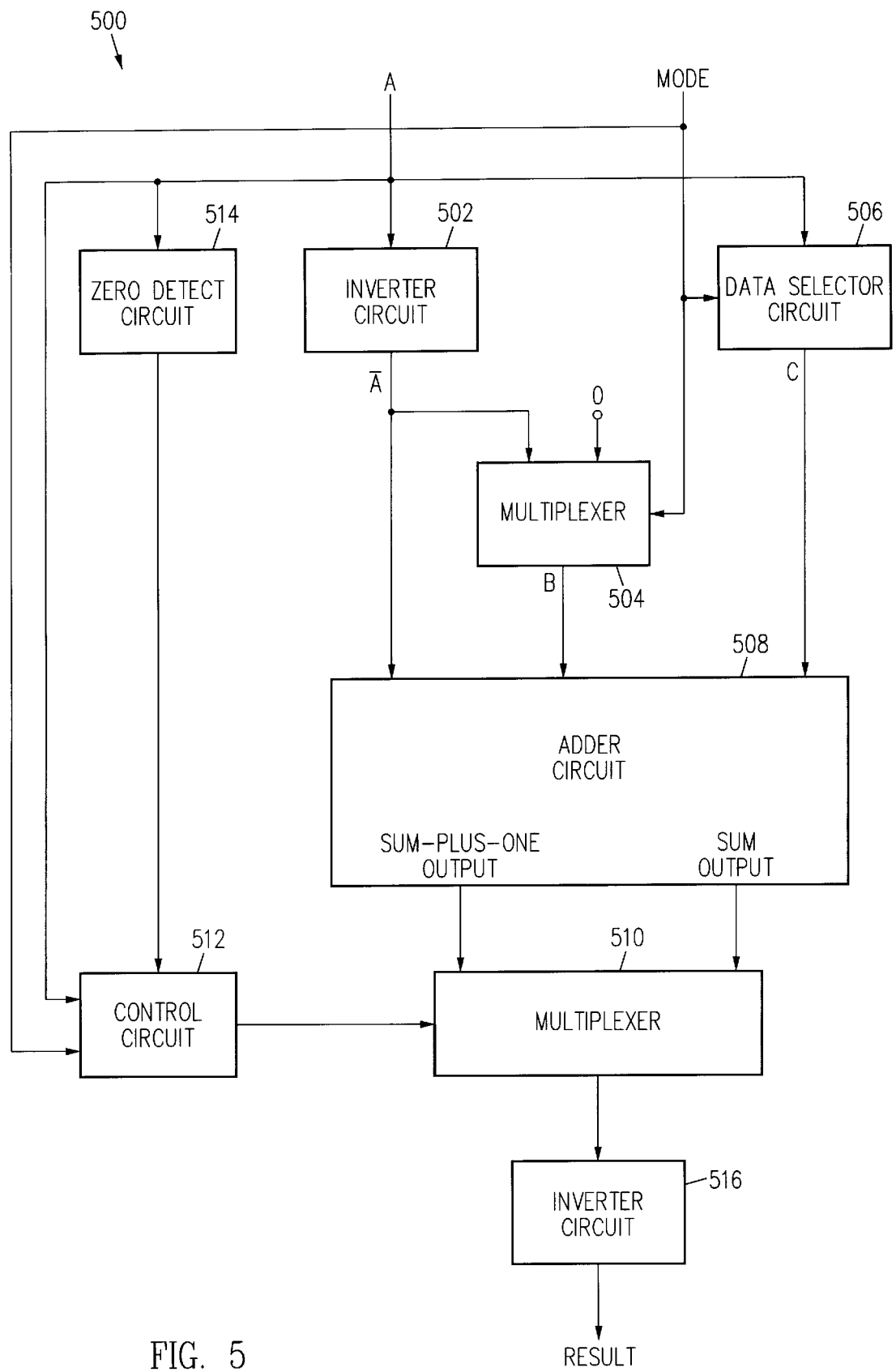
FIG. 5 is a logic circuit for calculating 2A+sign(A), 2A–sign(A), A+sign(A), and A–sign(A) in accordance with an embodiment of the present invention.

FIG. 5 is a block diagram of a logic circuit 500 for calculating 2A+sign(A), 2A sign(A), A+sign(A), and A−sign (A) in accordance with an embodiment of the present invention. Inverter circuit 502 includes an operand input coupled to A and generates $\overline{A}$ at an output. Multiplexer 504 receives $\overline{A}$ and zero at first and second operand inputs, and outputs either $\overline{A}$ or zero, shown as B, in response to a MODE signal (that may include several signals) that indicates which one of the sign 3 expression is selected. When the MODE signal indicates 2A+sign(A) or 2A−sign(A) is selected then multiplexer 504 outputs $\overline{A}$, whereas when the MODE signal indicates A+sign(A) or A−sign(A) is selected then multiplexer 504 outputs zero.

Data selector circuit 506 receives the MODE signal and A, and generates a constant C set to an appropriate value. In particular, data selector circuit 506 sets the constant C to two when A is negative and 2A+sign(A) is selected, to one when A is positive and 2A+sign(A) or 2A−sign(A) is selected or when A is negative and A+sign(A) is selected, to zero when A is negative and 2A−sign(A) is selected or when A is zero or greater than zero and even and A+sign(A) is selected or when A is positive and A−sign(A) is selected, and to negative one when A is positive and odd and A+sign(A) is selected or when A is negative and A−sign(A) is selected. The constant C as a function of the selected expression and A is listed below in Table 1.

TABLE 1

THE CONSTANT C AS A FUNCTION OF THE
SELECTED EXPRESSION AND A

| Selected Expression | A < 0 | A = 0 | A > 0 |
|---|---|---|---|
| 2A + sign(A) | 2 | 1 | 1 |
| 2A − sign(A) | 0 | 1 | 1 |
| A + sign(A) | 1 | 0 | −1 (A odd) |
|  |  |  | 0 (A even) |
| A − sign(A) | −1 | 0 | 0 |

Adder circuit 508 includes a first operand input for receiving $\overline{A}$, a second operand input for receiving $\overline{A}$ or zero from multiplexer 504, and a third operand input for receiving the constant C from data selector circuit 506. Adder circuit 508 generates the sum of the first, second and third operands at a sum output, and a sum-plus-one of the first, second and third operands at a sum-plus-one output. Thus, when 2A+sign(A) or 2A−sign(A) are selected, adder circuit 508 generates $\overline{A}+\overline{A}+C$ at the sum output and $\overline{A}+\overline{A}+C+1$ at the sum-plus one output, and when A+sign(A) or A−sign(A) are selected, adder circuit 508 generates $\overline{A}+C$ at the sum output and $\overline{A}+C+1$ at the sum-plus-one output.

Multiplexer 510 receives the sum output and sum-plus-one output at first and second operand inputs. Multiplexer 510 selects the sum output or the sum-plus-one output in response to a first control signal from control circuit 512. Multiplexer 510 also selects the sum output or the sum output with the LSB set to zero in response to a second control signal from control circuit 512. Thus, multiplexer 510 outputs either the sum output, the sum output with the LSB set to zero, or the sum-plus-one output in response to control circuit 512.

Control circuit 512 receives the MODE signal, A, and a zero detect signal from zero detect circuit 514. The zero detect signal indicates whether A is zero or nonzero. Control circuit 512 instructs multiplexer 510 to select the sum-plus-one output when A is greater than zero and 2A−sign(A) or A−sign(A) is selected. Control circuit 512 instructs multiplexer 510 to select the sum output when A is less than or equal to zero, or when A is greater than zero and odd when A+sign(A) is selected. Control circuit 512 instructs multiplexer 510 to select the sum output with the LSB set to zero when A is greater than zero and 2A+sign(A) is selected, or when A is greater than zero and even and A+sign(A) is selected. The output of multiplexer 510 as a function of the selected expression and A is listed below in Table 2.

TABLE 2

THE OUTPUT OF MULTIPLEXER 510 AS A FUNCTION OF
THE SELECTED EXPRESSION AND A

| Selected Expression | A < 0 | A = 0 | A > 0 |
|---|---|---|---|
| 2A + sign(A) | sum output | sum output | sum output with LSB = 0 |
| 2A − sign(A) | sum output | sum output | sum-plus-one output |
| A + sign(A) | sum output | sum output | sum output (A odd) sum output with LSB = 0 (A even) |

TABLE 2-continued

THE OUTPUT OF MULTIPLEXER 510 AS A FUNCTION OF THE SELECTED EXPRESSION AND A

| Selected Expression | A < 0 | A = 0 | A > 0 |
|---|---|---|---|
| A − sign(A) | sum output | sum output | sum-plus-one output |

Inverter circuit 516 receives the output of multiplexer 510, and generates the bit-complement thereof to provide the result. The result as a function of the selected expression and A is listed below in Table 3.

TABLE 3

THE RESULT AS A FUNCTION OF THE SELECTED EXPRESSION AND A

| Selected Expression | A < 0 | A = 0 | A > 0 |
|---|---|---|---|
| 2A + sign(A) | $\overline{\overline{A} + \overline{A} + 2}$ | $\overline{\overline{A} + \overline{A} + 1}$ | $\overline{\overline{A} + \overline{A} + 1 + 1}$ |
| 2A − sign(A) | $\overline{\overline{A} + \overline{A}}$ | $\overline{\overline{A} + \overline{A} + 1}$ | $\overline{\overline{A} + \overline{A} + 2}$ |
| A + sign(A) | $\overline{\overline{A} + 1}$ | $\overline{=}{A}$ | $\overline{\overline{A} - 1}$ (A odd)  $\overline{=}{A+1}$ (A even) |
| A − sign(A) | $\overline{\overline{A} - 1}$ | $\overline{=}{A}$ | $\overline{\overline{A} + 1}$ |

Numerous variations are available for logic circuit 500. For instance, inverter circuit 502 and multiplexer 504 can be modified to arithmetically left-shift $\overline{A}$ by one bit position and apply the arithmetically left-shifted $\overline{A}$ (or $2\overline{A}$) to the first operand input of adder circuit 508 when 2A+sign(A) or 2A−sign(A) is selected, and otherwise apply $\overline{A}$ to the first operand input. In this manner, the constant C can be applied to the second operand input of adder circuit 508, and the third operand input of adder circuit 508 is unnecessary. Various techniques can be used to set the LSB of the result to one when A is greater than zero and 2A+sign(A) is selected, or when A is greater than zero and even and A+sign(A) is selected. Moreover, zero detect circuit 514 can be modified to inspect carry-out bits from MSB positions of the sum and sum-plus-one outputs of adder circuit 508, instead of inspecting A directly.

FIGS. 6A–6D are a logic circuit for calculating 2A+sign(A), 2A−sign(A), A+sign(A), and A−sign(A) in accordance with another embodiment of the present invention. Logic circuit 600 receives a four-bit operand A, consisting of bits $A_3, A_2, A_1$ and $A_0$, and calculates a four-bit result, consisting of bits $R_3, R_2, R_1$ and $R_0$. Bits $A_3$ and $R_3$ are the MSBs. Logic circuit 600 also generates overflow signal OV. Logic circuit 600 receives expression selection signals DAS3 (double add sign 3), DSS3 (double subtract sign 3), AS3 (add sign 3) and SS3 (subtract sign 3) for selecting the expressions 2A+sign(A), 2A−sign(A), A+sign(A), and A−sign(A), respectively. Accordingly, signals DAS3, DSS3, AS3 and SS3 correspond to the MODE signal. A selected one of the expressions is calculated during a given instruction cycle. Therefore, when one of signals DAS3, DSS3, AS3 and SS3 is a one (or first logical value), the other signals are zero's (or a second logical value). The signals for selected expressions are listed below in Table 4.

TABLE 4

THE SIGNALS FOR SELECTED EXPRESSIONS

| Selected Expression | Signal |
|---|---|
| 2A + sign(A) | DAS3 |
| 2A − sign(A) | DSS3 |
| A + sign(A) | AS3 |
| A − sign(A) | SS3 |

Figure 6A:
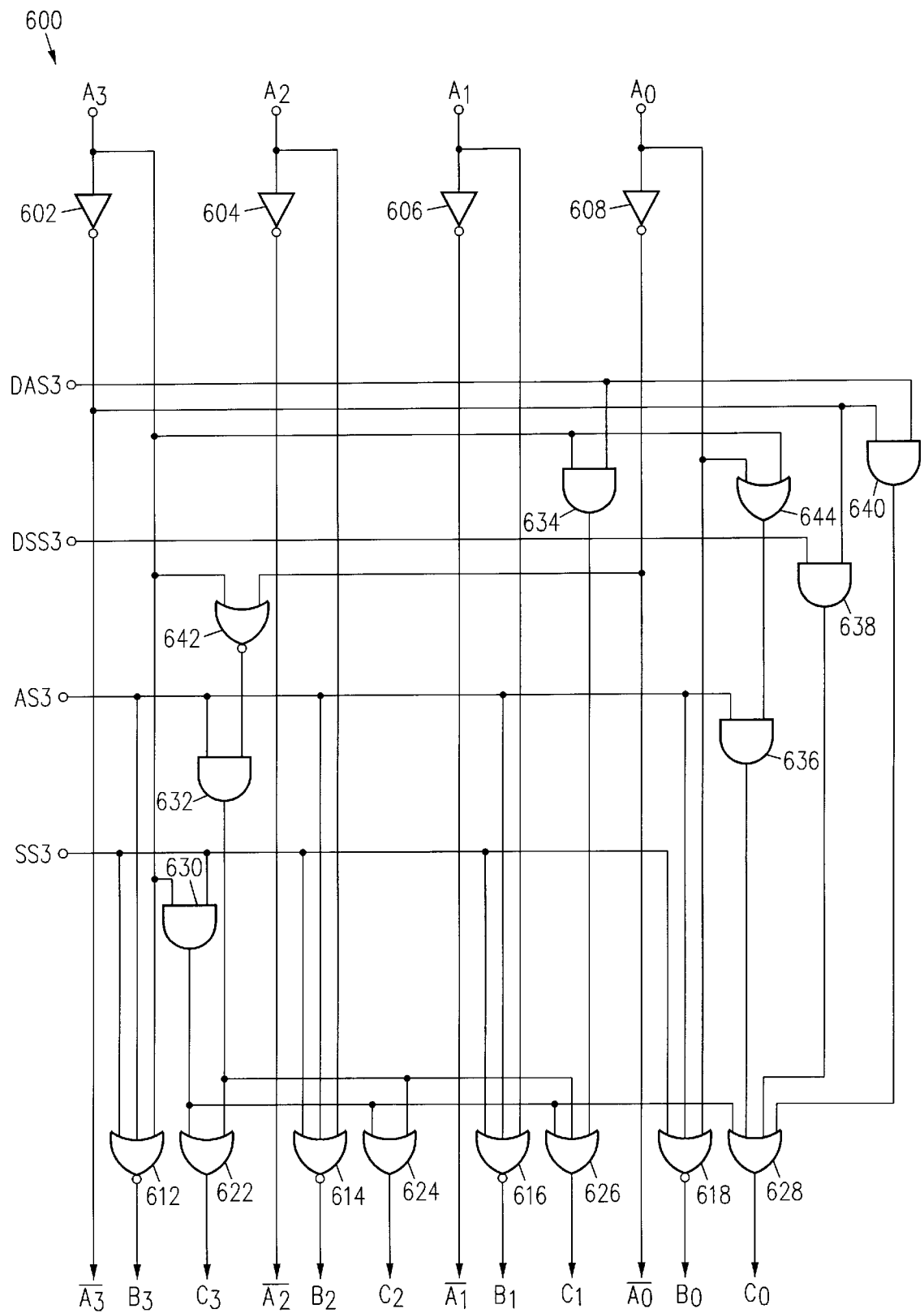
FIGS. 6A–6D are a logic circuit for calculating 2A+sign(A), 2A–sign(A), A+sign(A), and A–sign(A) in accordance with another embodiment of the present invention.

Referring to FIG. 6A, bit $A_3$ is applied to inverter 602, bit $A_2$ is applied to inverter 604, bit $A_1$ is applied to inverter 606, and bit $A_0$ is applied to inverter 608. Inverters 602, 604, 606 and 608 generate bits $\overline{A_3}, \overline{A_2}, \overline{A_1}$ and $\overline{A_0}$, respectively. Accordingly, inverters 602, 604, 606 and 608 correspond to inverter circuit 502.

NOR gates 612, 614, 616 and 618 receive bits $A_3, A_2, A_1$ and $A_0$, respectively. Furthermore, NOR gates 612, 614, 616 and 618 each receive signals AS3 and DS3. NOR gates 612, 614, 616 and 618 generate bits $B_3, B_2, B_1$ and $B_0$, respectively. Therefore, when signal DAS3 or DSS3 is a one (and thus signals AS3 and SS3 are both zero's),NOR gates 612, 614, 616 and 618 generate bits $B_3, B_2, B_1$ and $B_0$ as bits $\overline{A_3}, \overline{A_2}, \overline{A_1}$ and $\overline{A_0}$, respectively. On the other hand, when signal AS3 or SS3 is a one, NOR gates 612, 614, 616 and 618 generate bits $B_3, B_2, B_1$ and $B_0$ as zero's. Accordingly, NOR gates 612, 614, 616 and 618 correspond to multiplexer 504.

OR gates 622, 624, 626 and 628 generate bits $C_3, C_2, C_1$ and $C_0$, respectively. When signal DAS3 is a one and signals DSS3, AS3 and SS3 are zero's and bit $A_3$ is a one, AND gates 630 and 632 generate zero's, AND gate 634 generates a one, AND gates 636, 638 and 640 generate zero's, and OR gates 622, 624, 626 and 628 generate bits $C_3, C_2, C_1$ and $C_0$ as 0010. When signal DAS3 is a one and signals DSS3, AS3 and SS3 are zero's and bit $A_3$ is a zero, AND gates 630, 632 and 634 generate zero's, AND gate 640 generates a one, and OR gates 622, 624, 626 and 628 generate bits $C_3, C_2, C_1$ and $C_0$ as 0001. When signal DSS3 is a one and signals DAS3, AS3 and SS3 are zero's and bit $A_3$ is a one, AND gates 630, 632, 634, 636, 638 and 640 generate zero's, and OR gates 622, 624, 626 and 628 generate bits $C_3, C_2, C_1$ and $C_0$ as 0000. When signal DSS3 is a one and signals DAS3, AS3 and SS3 are zero's and bit $A_3$ is a zero, AND gates 630, 632 and 634 generate zero's, AND gate 638 generates a one, and OR gates 622, 624, 626 and 628 generate bits $C_3, C_2, C_1$ and $C_0$ as 0001. When signal AS3 is a one and signals DAS3, DSS3 and SS3 are zero's and bit $A_3$ is a one, NOR gate 642 generates a zero, OR gate 644 generates a one, AND gates 630, 632 and 634 generate zero's, AND gate 636 generates a one, and OR gates 622, 624, 626 and 628 generate bits $C_3, C_2, C_1$ and $C_0$ as 0001. When signal AS3 is a one and signals DAS3, DSS3 and SS3 are zero's and bits $A_3$ and $A_0$ are zero's, NOR gate 642 and OR gate 644 generate zero's, AND gates 630, 632, 634, 636, 638 and 640 generate zero's, and OR gates 622, 624, 626 and 628 generate bits $C_3, C_2, C_1$ and $C_0$ as 0000. When signal AS3 is a one and signals DAS3, DSS3 and SS3 are zero's and bit $A_3$ is a zero and bit $A_0$ is a one, NOR gate 642 and OR gate 644 generate one's, AND gates 632 and 636 generate one=3 s, and OR gates 622, 624, 626 and 628 generate bits $C_3, C_2, C_1$ and $C_0$ as 1111. When signal SS3 is a one and signals DAS3, DSS3 and AS3 are zero's and bit $A_3$ is a one, AND gate 630 generates a one and OR gates 622, 624, 626 and 628 generate bits $C_3, C_2, C_1$ and $C_0$ as 1111. When signal SS3 is a one and signals DAS3, DSS3 and AS3 are zero's and bit $A_3$ is a zero, AND gates 630, 632, 634, 636, 638 and 640 generate zero's and OR gates 622, 624, 626 and 628 generate bits $C_3$, $C_2$, $C_1$ and $C_0$ as 0000. Accordingly, OR gates 622, 624, 626, 628 and 644, AND gates 630, 632, 634, 636, 638 and 640, and NOR gate 642 correspond to data selector circuit 506.

Figure 6B:
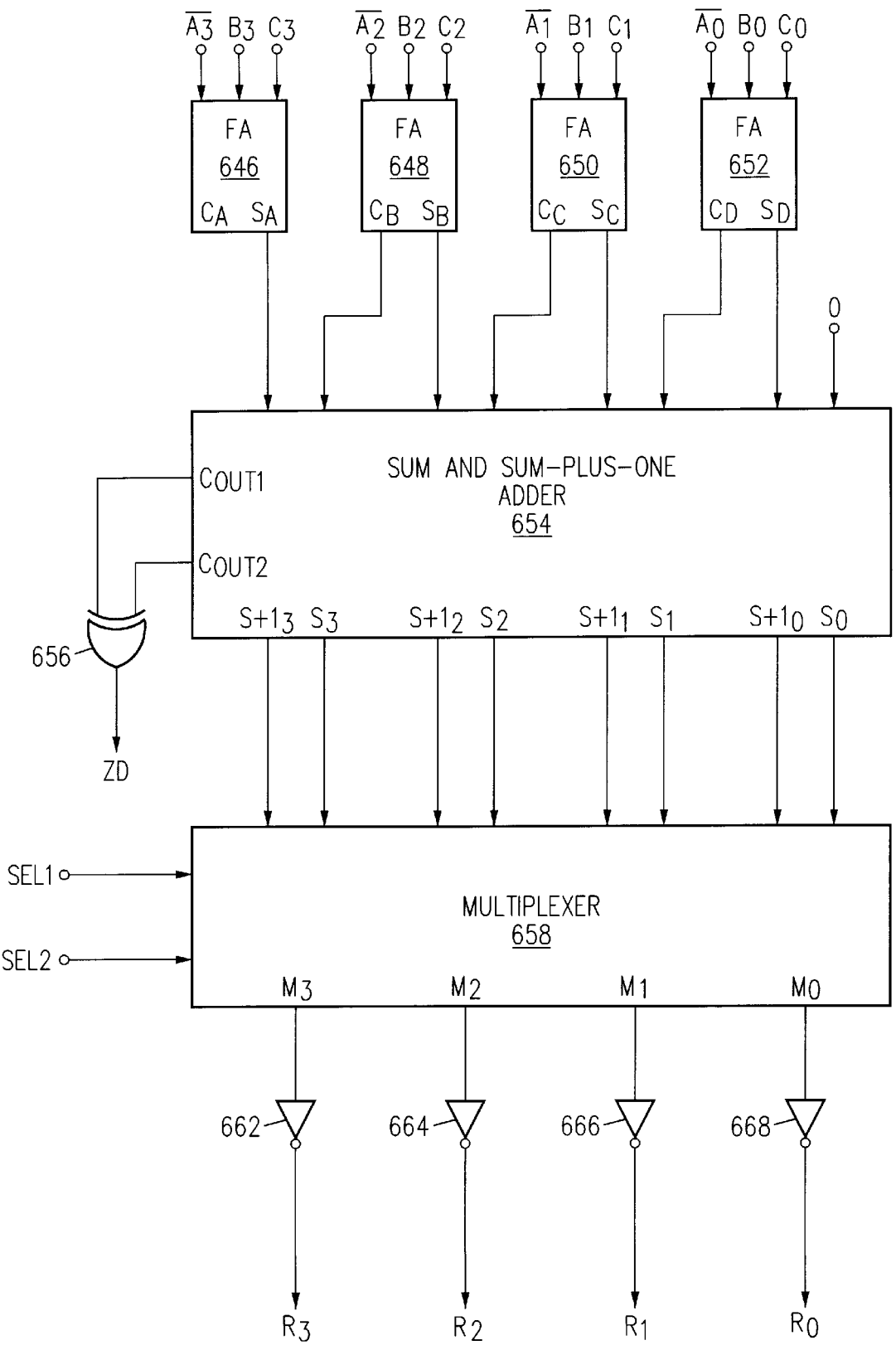

Referring to FIG. 6B, bits $\overline{A_3}$, $B_3$ and $C_3$ are applied to full adder 646, bits $\overline{A_2}$, $B_2$ and $C_2$ are applied to full adder 648, bits $\overline{A_1}$, $B_1$ and $C_1$ are applied to full adder 650, and bits $\overline{A_0}$, $B_0$ and $C_0$ are applied to full adder 652. The outputs of full adders 646, 648, 650 and 652 are applied to operand inputs of sum and sum-plus-one adder 654. In particular, sum bit $S_A$ of full adder 646 and carry-out bit $C_B$ of full adder 648 are applied to stage 3 of adder 654, sum bit $S_B$ of full adder 648 and carry-out bit $C_C$ of full adder 650 are applied to stage 2 of adder 654, sum bit $S_C$ of full adder 650 and carry-out bit $C_D$ of full adder 652 are applied to stage 1 of adder 654, and sum bit $S_D$ of full adder 652 and a zero are applied to stage 0 of adder 654. Adder 654 generates a sum output, consisting of bits $S_3$, $S_2$, $S_1$ and $S_0$, and a sum-plus-one output, consisting of bits $S+1_3$, $S+1_2$, $S+1_0$ and $S+1_0$. Adder 654 also generates first carry-out bit $C_{OUT1}$ from stage 3 of the sum output, and second carry-out bit $C_{OUT2}$ from stage 3 of the sum-plus-one output. Accordingly, full adders 646, 648, 650 and 652 and adder 654 correspond to adder circuit 508.

First and second carry-out bits $C_{OUT1}$ and $C_{OUT2}$ are applied to EXCLUSIVE-OR gate 656, which provides zero detect signal ZD. When bits $C_{OUT1}$ and $C_{OUT2}$ have different logical values signal ZD is a one, and when bits $C_{OUT1}$ and $C_{OUT2}$ have identical logical values signal ZD is a zero. EXCLUSIVE-OR gate 656 corresponds to zero detect circuit 514 noting that, as mentioned above, zero detect circuit 514 can be modified to inspect the carry-out bits from the MSB positions of the sum and sum-plus-one outputs of adder circuit 508.

The sum output and sum-plus-one output are applied to first and second operand inputs of multiplexer 658, and select signals SEL1 and SEL2 are applied to select inputs of multiplexer 658. Multiplexer 658 outputs bits $M_3$, $M_2$, $M_1$ and $M_0$. Signal SEL1 instructs multiplexer 658 to select between the sum and sum-plus-one outputs, and signal SEL2 instructs multiplexer 658 to select between the sum output and the sum-output with the LSB set to zero. In particular, when signal SEL1 is a one and signal SEL2 is a zero, multiplexer 658 sets bits $M_3$, $M_2$, $M_1$ and $M_0$ to bits $S+1_3$, $S+1_2$, $S+1_0$ and $S+1_0$. When signals SEL1 and SEL2 are zero's, multiplexer 658 sets bits $M_3$, $M_2$, $M_1$ and $M_0$ to bits $S_3$, $S_2$, $S_1$ and $S_0$, respectively. When signal SEL1 is a zero and signal SEL2 is a one, multiplexer 658 sets bits $M_3$, $M_2$, $M_1$ and $M_0$ to bits $S_3$, $S_2$ and $S_1$ and a zero, respectively. Accordingly, multiplexer 658 corresponds to multiplexer 510.

Bit $M_3$ is applied to inverter 662, bit $M_2$ is applied to inverter 664, bit $M_1$ is applied to inverter 666, and bit $M_0$ is applied to inverter 668. Inverters 662, 664, 666 and 668 generate bits $R_3$, $R_2$, $R_1$ and $R_0$, respectively. Accordingly, inverters 662, 664, 666 and 668 correspond to inverter circuit 516.

Figure 6C:
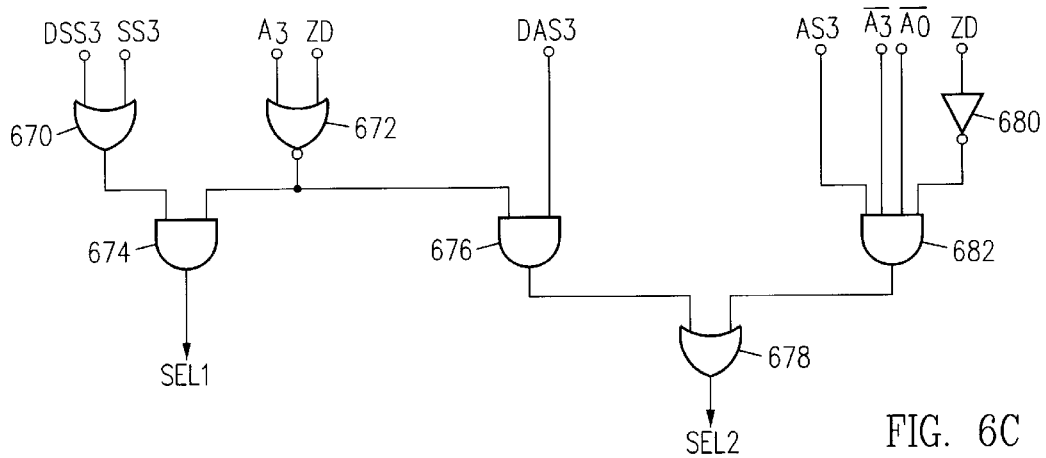

Referring to FIG. 6C, signals DSS3 and SS3 are applied to OR gate 670, bit $A_3$ and signal ZD are applied to NOR gate 672, and the outputs of OR gate 670 and NOR gate 672 are applied to AND gate 674, which generates signal SEL1. When signal DSS3 or signal SS3 is a one, and bit $A_3$ and signal ZD are both zero's (indicating A is greater than zero) then signal SEL1 is a one, otherwise signal SEL1 is a zero.

Signal DAS3 and the output of NOR gate 672 are applied to AND gate 676, and the output of AND gate 676 is applied to OR gate 678 which generates signal SEL2. Furthermore, signal AS3, the bit-complement of signal ZD (via inverter 680) and bits $\overline{A_3}$ and $\overline{A}$ are applied to 4-input AND gate 682, and the output of AND gate 682 is applied to OR gate 678. When signal DAS3 is a one and bit $A_3$ and signal ZD are both zero's (indicating A is greater than zero) then signal SEL2 is a one. When signal AS3 is a one, and signal ZD is a zero and bits $\overline{A_3}$ and $\overline{A_0}$ are both one's (indicating A is greater than zero and even) then signal SEL2 is a one. Otherwise, signal SEL2 is a zero. Accordingly, OR gates 670 and 678, NOR gate 672, AND gates 674, 676 and 682, and inverter 680 correspond to control circuit 512.

Figure 6D:
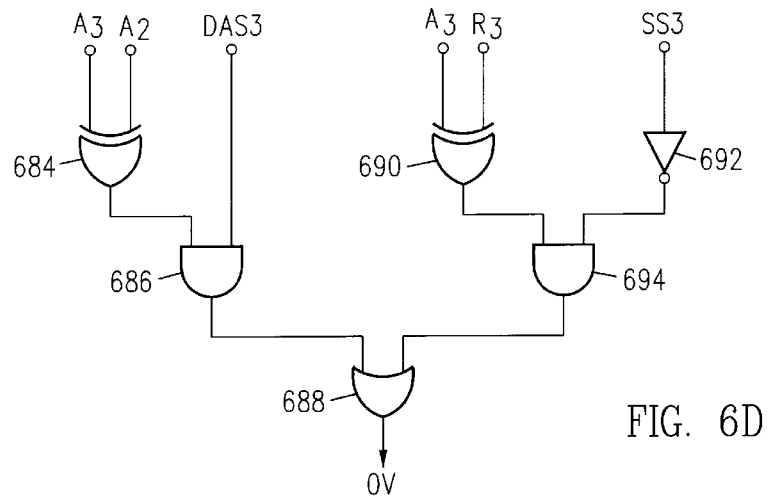

Referring to FIG. 6D, bits $A_3$ and $A_2$ are applied to EXCLUSIVE-OR gate 684, and signal DAS3 and the output of EXCLUSIVE-OR gate 684 are applied to AND gate 686, the output of which is applied to OR gate 688 which generates signal OV, indicative of overflow. In addition, bits $A_3$ and $R_3$ are applied to EXCLUSIVE-OR gate 690, signal SS3 is applied to inverter 692, the outputs of EXCLUSIVE-OR gate 690 and inverter 692 are applied to AND gate 694, and the output of AND gate 694 is applied to OR gate 688. When signal DAS3 is a one and the two most significant bits of A have different logical values then signal OV is a one. When signal DAS3, DSS3 or AS3 is a one (and therefore signal SS3 is a zero) and the MSBs (or sign bits) of A and the result have different logical values, then signal OV is a one. Otherwise, signal OV is a zero. It is noted that when signal SS3 is a one, overflow never occurs, even though the MSBs of A and the result have different logical values when A is negative one and the result is zero (−1−(−1)=0). Applying the bit-complement of signal SS3 to AND gate 694 prevents setting signal OV to a one under these circumstances. Alternatively, if desired, the bit-complement of signal ZD provided by inverter 680 can be applied to AND gate 694 instead of the bit-complement of signal SS3.

Suppose signal DAS3 is a one (and therefore signals DSS3, AS3 and SS3 are zero's). When A is less than zero adder 654 generates $\overline{A}+\overline{A}+2$ at the sum output, multiplexer 658 selects the sum output, and inverters 662 to 668 generate $\overline{\overline{A}+\overline{A}+2}$. When A is equal to zero, adder 654 generates $\overline{A}+\overline{A}+1$ at the sum output, multiplexer 658 selects the sum output, and inverters 662 to 668 generate $\overline{\overline{A}+\overline{A}+1}$. When A is greater than zero, adder 654 generates $\overline{A}+\overline{A}+1$ at the sum output, multiplexer 658 selects the sum output with the LSB set to zero, and inverters 662 to 668 generate $\overline{\overline{A}+\overline{A}+1+1}$.

Suppose signal DSS3 is a one (and therefore signals DAS3, AS3 and SS3 are zero's). When A is less than zero, adder 654 generates $\overline{A}+\overline{A}$ at the sum output, multiplexer 658 selects the sum output, and inverters 662 to 668 generate $\overline{\overline{A}+\overline{A}}$. When A is equal to zero, adder 654 generates $\overline{A}+\overline{A}-1$ at the sum output, multiplexer 658 selects the sum output, and inverters 662 to 668 generate $\overline{\overline{A}+\overline{A}+1}$. When A is greater than zero, adder 654 generates $\overline{A}+\overline{A}+2$ at the sum-plus-one output, multiplexer 658 selects the sum-plus-one output, and inverters 662 to 668 generate $\overline{\overline{A}+\overline{A}+2}$.

Suppose signal AS3 is a one (and therefore signals DAS3, DSS3 and SS3 are zero's). When A is less than zero, adder 654 generates $\overline{A}+1$ at the sum output, multiplexer 658 selects the sum output, and inverters 662 to 668 generate $\overline{\overline{A}+1}$. When A is equal to zero, adder 654 generates $\overline{A}+0$ at the sum output, multiplexer 658 selects the sum output, and inverters 662 to 668 generate $\overline{\overline{A}}$. When A is greater than zero and odd, adder 654 generates $\overline{A}-1$ at the sum output, multiplexer 658 selects the sum output, and inverters 662 to 668 generate $\overline{\overline{A}-1}$. When A is greater than zero and even, adder 654 generates $\overline{A}$+0 at the sum output, multiplexer 658 selects the sum output with the LSB set to zero, and inverters 662 to 668 generate $\overline{A}$+1.

Suppose signal SS3 is a one (and therefore signals DAS3, DSS3 and AS3 are zero's). When A is less than zero, adder 654 generates $\overline{A}$−1 at the sum output, multiplexer 658 selects the sum output, and inverters 662 to 668 generate $\overline{\overline{A}-1}$. When A is equal to zero, adder 654 generates $\overline{A}$ at the sum output, multiplexer 658 selects the sum output, and inverters 662 to 668 generate $\overline{\overline{A}}$. When A is greater than zero, adder 654 generates $\overline{A}$+1 at the sum-plus-one output, multiplexer 658 selects the sum-plus-one output, and inverters 662 to 668 generate $\overline{\overline{A}+1}$.

Figure 7:
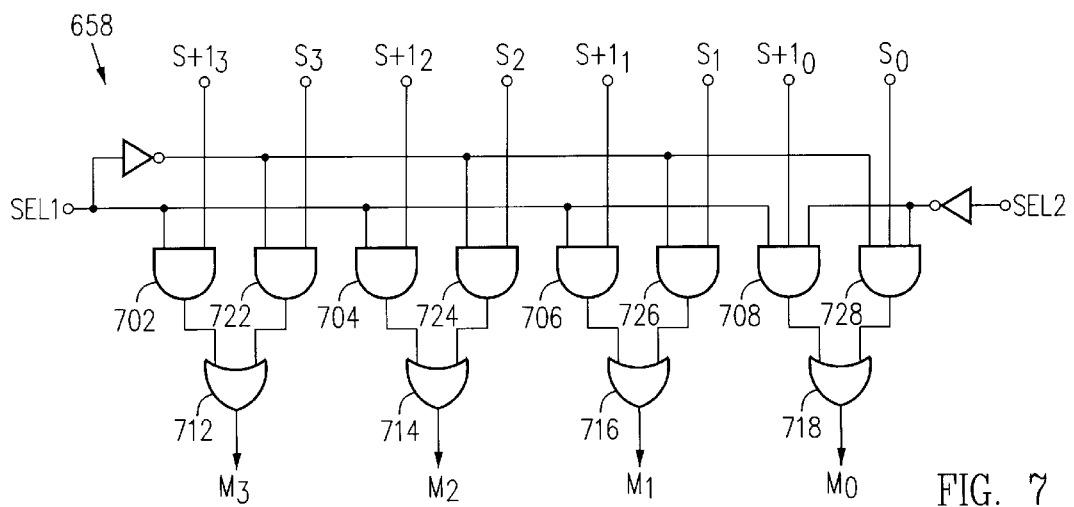
FIG. 7 is a multiplexer suitable for use in the logic circuit of FIGS. 6A–6D.

FIG. 7 shows an implementation of multiplexer 658. When signal SEL1 is a one and signal SEL2 is a zero, AND gates 702, 704, 706 and 708 couple bits S+1$_3$, S+1$_2$, S+1$_1$ and S+1$_0$ to OR gates 712, 714, 716 and 718 to provide bits M$_3$, M$_2$, M$_3$ and M$_0$, respectively. Likewise, when signals SEL1 and SEL2 are both zero's, AND gates 722, 724, 726 and 728 couple bits S$_3$, S$_2$, S$_1$ and S$_0$ to OR gates 712, 714, 716 and 718 to provide bits M$_3$, M$_2$, M$_1$ and M$_0$, respectively. Finally, when signal SEL1 is a zero and signal SEL2 is a one, AND gates 722, 724, 726 and 728 couple bits S$_3$, S$_2$ and S$_1$ and a zero to OR gates 712, 714, 716 and 718 to provide bits M$_3$, M$_2$, M$_1$ and M$_0$, respectively. At no time are signals SEL1 and SEL2 concurrently set to one.

Figure 8:
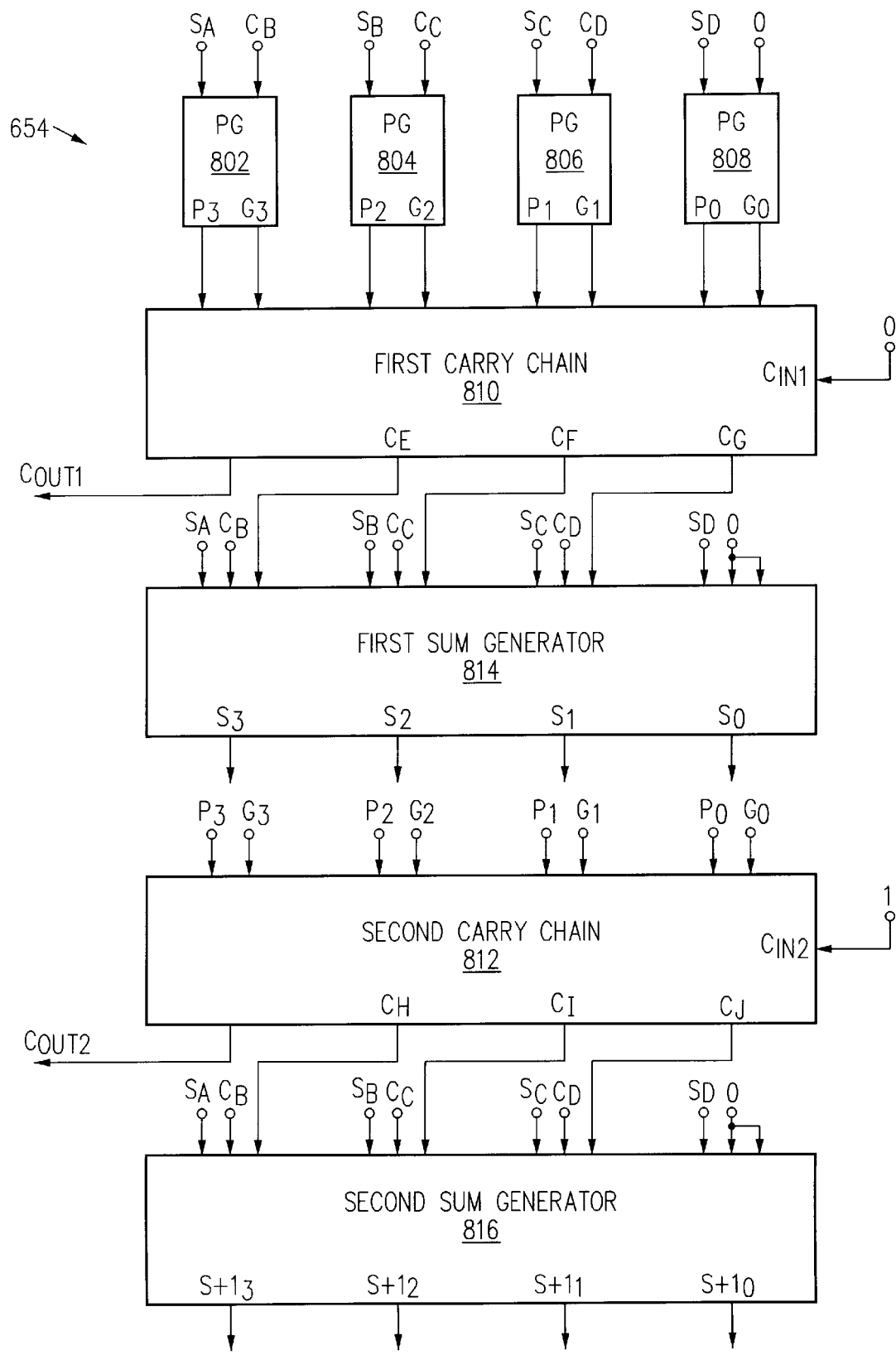
FIG. 8 is a sum and sum-plus-one adder suitable for use in the logic circuit of FIGS. 6A–6D.

FIG. 8 shows an implementation for adder 654. In this implementation, the sum output is provided by a carry lookahead adder that performs fast addition within the basic step time of an instruction cycle. Propagate-generate(PG) sections 802, 804, 806 and 808 receive bits S$_A$ and C$_B$, S$_B$ and C$_C$, S$_C$ and C$_D$, and S$_D$ and a zero, respectively, and provide propagate and generate signals P$_3$ and G$_3$, P$_2$ and G$_2$, P$_1$ and G$_1$, and P$_0$ and G$_0$, respectively. The propagate and generate signals are finished to respective stages of first carry chain 810 and second carry chain 812. First carry chain 810 receives a zero as its least significant carry-in bit C$_{IN1}$, and generates carry-out bits C$_{OUT1}$ C$_E$, C$_F$ and C$_0$. Second carry chain 812 receives a one as its least significant carry-in bit C$_{IN2}$, and generates carry-out bits C$_{OUT2}$, C$_H$, C$_1$ and C$_J$. Thus, first and second carry-out bits C$_{OUT1}$ and C$_{OUT2}$ are generated from the MSB positions of carry chains 810 and 812, respectively. Advantageously, first and second carry-out bits C$_{OUT1}$ and C$_{OUT2}$ are generated concurrently. Sum generator 814 receives bits S$_A$, C$_B$ and C$_E$ at stage 3, bits S$_B$, C$_C$, and C$_F$ at stage 2, bits S$_C$, C$_D$ and C$_G$ at stage 1, and bit S$_D$ and a pair of zero's at stage 0, and generates sum bits S$_3$, S$_2$, S$_1$,and S$_0$. Likewise, sum generator 816 receives bits S$_A$, C$_B$ and C$_H$ at stage 3, bits S$_B$, C$_C$, and C$_1$ at stage 2, bits S$_C$, C$_D$ and C$_J$ at stage 1, and bit S$_D$ and a pair of zero's at stage 0, and generates sum bits S+1$_3$, S+1$_2$, S+1$_1$ and S+1$_0$. Each stage of sum generators 814 and 816 may include, for instance, first and second two-input EXCLUSIVE-OR gates (not shown), with the inputs of the first EXCLUSIVE-OR gate and the second input of the second EXCLUSIVE-OR gate receiving the bits to be summed, the output of the first EXCLUSIVE-OR gate coupled to the first input of the second EXCLUSIVE-OR gate, and the output of the second EXCLUSIVE-OR gate providing the sum bit. Suitable PG sections, carry chains and sum generators are well-known in the art.

The description of the invention set forth herein is illustrative, and is not intended to limit the scope of the invention as set forth in the following claims. A general purpose computer or processor can execute the invention in a single instruction cycle (as is preferred) or multiple instruction cycles. The invention is well-suited for many data processing applications. Variations and modifications of the embodiments disclosed herein may be made based on the description set forth herein, without departing from the scope and spirit of the invention as set forth in the following claims.

What is claimed is:

1. An apparatus for calculating a selected one of the expressions 2A+sign(A), 2A−sign(A), A+sign(A), and A−sign(A), where A is a signed binary integer represented in 2's complement form, sign(A) is equal to one when A is greater than zero, sign(A) is equal to zero when A is zero, and sign(A) is equal to negative one when A is less than zero, comprising:

a first inverter circuit for bit-complementing A to obtain $\overline{A}$;

a first multiplexer for selecting between $\overline{A}$ and zero in response to a MODE signal, indicative of which expression is selected, to generate B;

data selector circuit for providing a constant C in response to the MODE signal and A;

an adder circuit for calculating ($\overline{A}$+B+C) at a sum output and ($\overline{A}$+B+C+1) at a sum-plus-one output; and a second multiplexer coupled to a second inverter circuit for selecting between a bit-complement of the sum-plus-one output, a bit complement of the sum output, and a bit-complement of all bits except an LSB of the sum output to provide the selected expression.

2. The apparatus of claim 1, including a control circuit for controlling the second multiplexer in response to an MSB of A, an LSB of A, the MODE signal, and a zero detect circuit that indicates whether A is zero or nonzero.

3. The apparatus of claim 1, including a zero detect circuit that indicates whether A is zero or nonzero by inspecting a first carry-out bit from the sum output and a second carry-out bit from the sum-plus-one output.

4. The apparatus of claim 1, including an overflow detection circuit.

5. An apparatus for calculating a selected one of the expressions 2A+sign(A), 2A−sign(A), A+sign(A), and A−sign(A) in response to expression selection signals, where A is a signed binary integer represented in 2's complement form, sign(A) is equal to one when A is greater than zero, sign(A) is equal to zero when A is zero, and sign(A) is equal to negative one when A is less than zero, comprising:

a first inverter circuit having an operand input coupled to A for providing a bit-complement of A;

a first multiplexer for selecting between $\overline{A}$ and zero as a function of the expression selection signals;

a data selector circuit for providing a constant C as a function of the expression selection signals and an MSB and LSB of A;

an adder circuit having first, second and third operand inputs coupled to outputs of the first inverter circuit, the first multiplexer, and the data selector circuit, respectively, having a sum output representing a sum of the first, second and third operands, and having a sum-plus-one output representing a sum-plus-one of the first, second and third operands;

a zero detect circuit for determining whether A is zero or nonzero;

a second multiplexer having a first input coupled to the sum output, and having a second input coupled to the sum-plus-one output;

a control circuit for instructing the second multiplexer to select between the sum output with an LSB set to zero, the sum output and the sum-plus-one output as a function of the expression selection signals, the MSB and LSB of A, and the zero detect circuit; and a second inverter circuit for bit-complementing an output of the second multiplexer to provide the selected one of the expressions.

6. The apparatus of claim 5, wherein the first multiplexer selects $\overline{A}$ when 2A+sign(A) or 2A−sign(A) is selected, and selects zero when A+sign(A) or A−sign(A) is selected.

7. The apparatus of claim 5, wherein the data selector circuit sets the constant C to two when A is negative and 2A+sign(A) is selected, to one when A is positive and 2A+sign(A) or 2A−sign(A) is selected or when A is negative and A+sign(A) is selected, to zero when A is negative and 2A−sign(A) is selected or when A is zero or greater than zero and even and A+sign(A) is selected or when A is positive and A−sign(A) is selected, and to negative one when A is positive and odd and A+sign(A) is selected or when A is negative and A−sign(A) is selected.

8. The apparatus of claim 5, wherein the control circuit instructs the second multiplexer to select the sum-plus-one output when A is greater than zero and 2A−sign(A) or A−sign(A) is selected, to select the sum output when A is less than or equal to zero or when A is greater than zero and odd and A+sign(A) is selected, and to select the sum output with the LSB set to zero when A is greater than zero and 2A+sign(A) is selected or when A is greater than zero and even and A+sign(A) is selected.

9. The apparatus of claim 1 including an overflow detection circuit that determines whether the MSB and second MSB of A have different logical values, and whether the MSB of A and an MSB of the second inverter circuit have different logical values.

10. The apparatus of claim 5, wherein the zero detect circuit determines whether a first carry-out bit from the sum output and a second carry-out bit from the sum-plus-one output have different logical values.

11. The apparatus of claim 10, wherein the first and second carry-out bits are generated concurrently.

12. The apparatus of claim 5, wherein the adder circuit includes a row of carry save adders that provide the first, second and third operand inputs, a sum adder coupled to the carry save adders for providing the sum output, and a sum-plus-one adder coupled to the carry save adders for providing the sum-plus-one output.

13. The apparatus of claim 12, wherein:

the sum adder includes propagate-generate sections coupled to a first carry chain coupled to a first sum generator that provides the sum output, with the first carry chain having a carry-in bit set to zero; and the sum-plus-one adder includes the propagate-generate sections coupled to a second carry chain coupled to a second sum generator that provides the sum-plus-one output, with the second carry chain having a carry-in bit set to one.

14. An apparatus for calculating a selected one of the expressions 2A+sign(A), 2A−sign(A), A+sign(A), and A−sign(A) in response to expression selection signals, where A is a signed binary integer represented in 2's complement form, sign(A) is equal to one when A is greater than zeros sign(A) is equal to zero when A is zero, and sign(A) is equal to negative one when A is less than zero, comprising:

first inverter and multiplexer means for selecting between $\overline{A}$ and $2\overline{A}$ as a function of the expression selection signals;

data selector means for providing a constant C as a function of the expression selection signals and A;

adder means having operand inputs coupled to the first inverter and multiplexer means and the data selector means, having a sum output representing a sum of the operands, and having a sum-plus-one output representing a sum-plus-one of the operands;

zero detect means for determining whether A is zero or nonzero; and second inverter and multiplexer means for selecting between a bit-complement of all bits except an LSB of the sum output, a bit-complement of the sum output, and a bit-complement of the sum-plus-one output as a function of the expression selection signals and the zero detect means and A, thereby providing the selected one of the expressions.

* * * * *

UNITED STATES PATENT AND TRADEMARK OFFICE
CERTIFICATE OF CORRECTION

PATENT NO.    : 5,835,394
ISSUE DATE    : November 10, 1998
INVENTOR(S)   : Wong, Roney S.

It is certified that error appears in the above-identified patent and that said Letters Patent is hereby corrected as shown below:

Column 6, line 46; please delete "08/719,187" and insert --08/719,198--.

Signed and Sealed this

Tenth Day of August, 1999

*Attest:*

Q. TODD DICKINSON

*Attesting Officer*    *Acting Commissioner of Patents and Trademarks*